US00RE45641E

(19) United States
(12) Reissued Patent
Henriksen et al.

(10) Patent Number: US RE45,641 E
(45) Date of Reissued Patent: Aug. 4, 2015

(54) MUD FLOW BACK VALVE

(71) Applicants: Knut H. Henriksen, Stavanger (NO); Cecilie T. Misiewicz, Raade (NO)

(72) Inventors: Knut H. Henriksen, Stavanger (NO); Cecilie T. Misiewicz, Raade (NO)

(73) Assignee: Baker Hughes Incorporated, Houston, TX (US)

(21) Appl. No.: 13/967,090

(22) Filed: Aug. 14, 2013

Related U.S. Patent Documents

Reissue of:
(64) Patent No.: 6,976,542
Issued: Dec. 20, 2005
Appl. No.: 10/679,232
Filed: Oct. 3, 2003

(51) Int. Cl.
*E21B 33/12* (2006.01)

(52) U.S. Cl.
CPC ..... *E21B 33/12* (2013.01)

(58) Field of Classification Search
USPC ..... 166/386, 319, 320, 321; 137/67
See application file for complete search history.

(56) References Cited

U.S. PATENT DOCUMENTS

| | | | | |
|---|---|---|---|---|
| 2,869,475 | A * | 1/1959 | Bobo | 417/111 |
| 5,148,825 | A * | 9/1992 | Gil et al. | 137/78.3 |
| 5,722,931 | A * | 3/1998 | Heaven | 600/29 |
| 6,367,547 | B1 * | 4/2002 | Towers et al. | 166/265 |
| 6,505,682 | B2 | 1/2003 | Brockman | |
| 7,059,415 | B2 | 6/2006 | Bosma et al. | |
| 2002/0174981 | A1 | 11/2002 | Boer et al. | |

FOREIGN PATENT DOCUMENTS

| | | |
|---|---|---|
| WO | PCT/US00/02420 | 1/2000 |
| WO | PCT/GB02/00362 | 1/2002 |
| WO | PCT/GB02/005933 | 12/2002 |
| WO | PCT/EP03/010004 | 9/2003 |

* cited by examiner

*Primary Examiner* — William P Neuder
(74) *Attorney, Agent, or Firm* — Steve Rosenblatt

(57) ABSTRACT

A valve for downhole use allows flow of mud or completion fluids but closes when subjected to produced hydrocarbons. The flow through the valve is through an annular passage that features a sleeve preferably made of rubber. The passage remains open during completion operations, but when hydrocarbons are produced the rubber swells and the passage is closed off. Applications include completions involving long horizontal runs and small inside diameter laterals where access to a sliding sleeve with coiled tubing or a wireline run tool is not practical.

19 Claims, 3 Drawing Sheets

MUD FLOW BACK VALVE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

FIELD OF THE INVENTION

The field of the invention is downhole valves and more particularly valves that can be operated between an open and closed position using the well fluid that flows through them.

BACKGROUND OF THE INVENTION

Downhole valves have been used to provide selective access from different strata into a well. Typically these valves employ a sliding sleeve to selectively align or mis-align openings on an inner sliding sleeve mounted concentrically with a housing. The sliding sleeve can have grooves or recesses near its end for engagement by a tool to slide the sleeve in one direction or another. Typically the tool to operate the sliding sleeve is delivered on coiled tubing or wireline, however, rigid tubing could also be used.

Many applications in deviated wellbores, particularly those with long horizontal sections, present unique difficulties to the traditional methods of operating sliding sleeve valves with tools delivered on coiled tubing or wireline. Other applications, such as junctions in multi-lateral systems have such small inside diameters so as to make operation of the sleeve using coiled tubing or wireline, virtually impossible.

One solution to this problem of lack of access for traditional tools to shift the sleeve has been to provide a local source of power, such as a battery, and use it to power the sleeve between the open and closed positions. However, there are still reliability issues with using battery power and should the valve fail to close, there is no backup way to get access to it to get it to close.

The need to use valves in applications where traditional type of access is not available, has spurred the need for the present invention. In seeking a more reliable way to operate a valve that, in effect, cannot be mechanically accessed, the valve of the present invention has been developed. The valve features, in a preferred embodiment, an annular passage lined with a material that is sensitive to some fluids but not to others. It can remain open until contacted by a fluid that makes the liner swell. The swelling closes off the flow path through the valve body to allow subsequent operations to take place. This valve type has particular application to screened main bores used in conjunction with open laterals. In such applications, high mud flow rates are experienced during completion operations making it desirable to bypass screens in the main bore completion. However, when production of hydrocarbons begins, it is desirable to close the bypass for the screens and direct production of hydrocarbons through such screens. The valve of the present invention can do this. Exposure to produced hydrocarbons can result in sufficient swelling to make the valve close. When this happens, the produced fluid can be directed to flow through a screen on the way to the surface. These and other advantages of the present invention will become apparent to those skilled in the art from a review of the description of the preferred embodiment and the drawings and the claims that appear below.

SUMMARY OF THE INVENTION

A valve for downhole use allows flow of mud or completion fluids but closes when subjected to produced hydrocarbons. The flow through the valve is through an annular passage that features a sleeve preferably made of rubber. The passage remains open during completion operations, but when hydrocarbons are produced the rubber swells and the passage is closed off. Applications include completions involving long horizontal runs and small inside diameter laterals where access to a sliding sleeve with coiled tubing or a wireline run tool is not practical.

DETAILED DESCRIPTION OF THE PREFERRED EMBODIMENT

Figure 1:
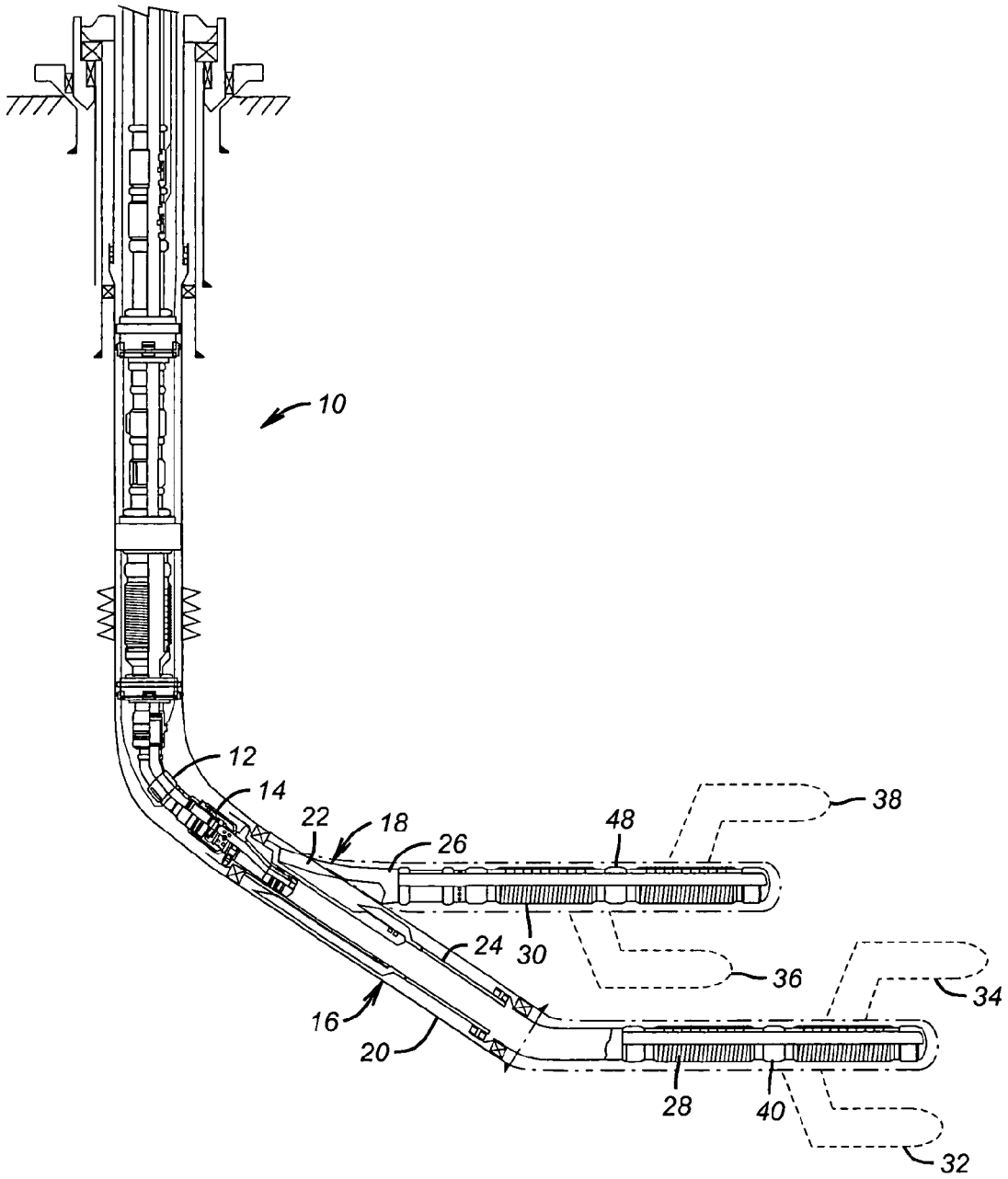
FIG. 1 is a section view of a wellbore showing the main bores completed with screens and the valve of the present invention positioned in the screen assemblies adjacent laterals with no production pipe.
Figure 2:
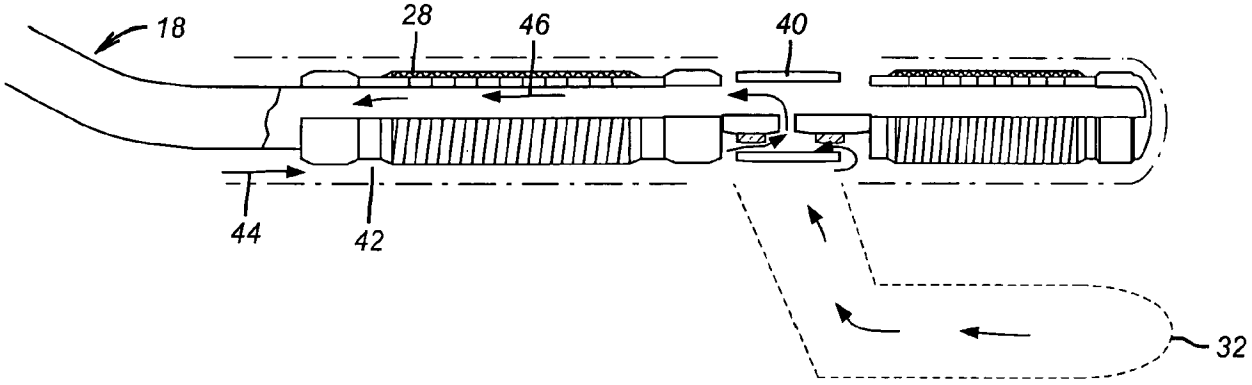
FIG. 2 is a detailed view from FIG. 1, showing the valve of the present invention in the open position.

FIG. 1 illustrates an application of the present invention. Well 10 has production tubing 12 going to a lateral 14. At lateral 14 the well 10 splits into branches 16 and 18, which are respectively cased with casing 20 and 22. The production tubing 24 and 26 extends respectively through casing 20 and 22 to respectively terminate in screen assemblies 28 and 30. Branch 16 has several branches 32 and 34 which are left "barefoot", that is to say there is no production tubing in them and this is their condition during completion and in subsequent production. Similarly branch 18 has several branches such as 36 and 38 that are likewise barefoot. Screen assembly 28 has a valve 40 that allows high flow rates down annulus 42, represented by arrow 44 shown in FIG. 2. These high flow rates of drilling mud or other completion fluids can bypass screen assembly 28 from branch 32 by flowing through screen assembly 28 after passing through open valve 40. This return flow is represented by arrow 46. The same flow pattern exists from branches 36 and 38 into branch 18 and branch 32 into branch 16. The may be an offset between the start of a branch and the valve through which completion fluids or mud will flow. If that is the case the flow will go through the annular space around the screen assembly, such as 28 or 30 until reaching a valve such as 40 or 48.

Figure 3:
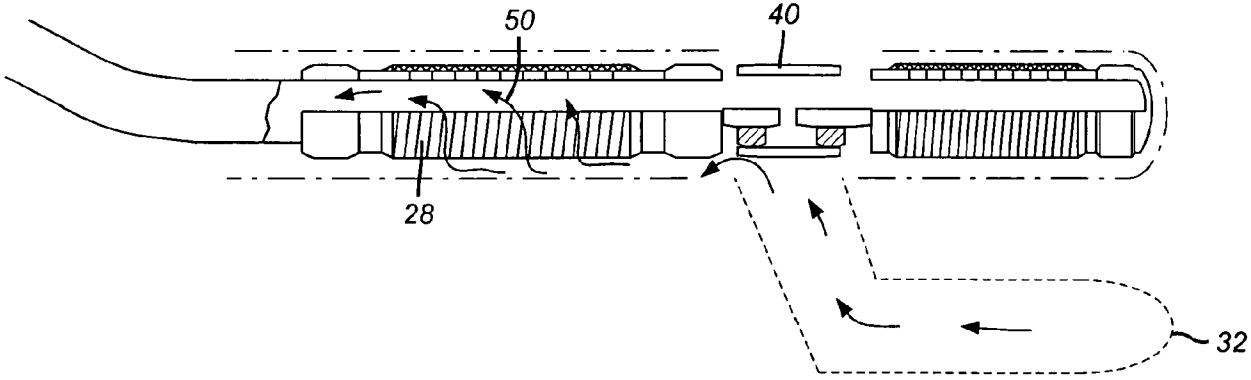
FIG. 3 is the view of FIG. 2 with the valve in the closed position.

As shown in FIG. 3, when the valve 40 moves to a closed position because branch 32 is in production, the flow uphole 50 goes into annulus 42 and through the screen assembly 28. Essentially the production flow is forced through the screen assemblies 28 and 30 with the valves 40 and 48 closed due to production from the branches below them. This is to be contrasted with the flow pattern bypassing the screen assemblies 28 and 30 when valves 40 and 48 are open during completion with mud or other fluids.

Figure 4:
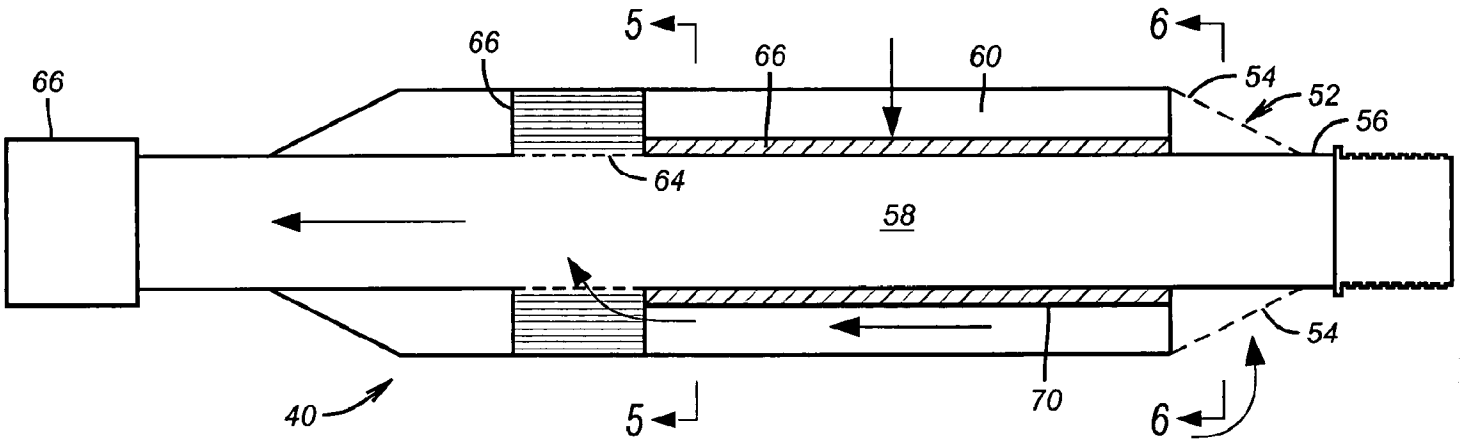
FIG. 4 is a section view through the valve, shown in the open position.
Figure 6:
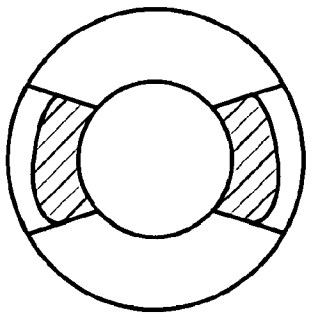
FIG. 6 is a section view through line 6-6 of FIG. 4 with the valve in the closed position.
Figure 5:
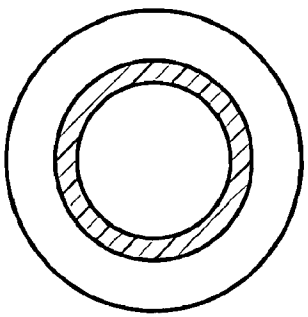
FIG. 5 is a section through line 5-5 of FIG. 4.

FIGS. 4-6 show the operation of one embodiment of the valve 40 or 48. The valve such as 40 has a circular inlet 52 made of a plurality of smaller openings 54. Valve 40 has a mandrel 56 with a central passage 58. An annular path 60 begins near openings 54 and terminates at end wall 62. A series of openings 64 allow access from annular path 60 into central passage 58. Connection 66 is secured to the screen assembly 28 to allow returning mud or other completion fluid to pass through the interior of the screen assembly, such as 28. A sleeve 68 is disposed in annular passage 60 and when drilling mud or completion fluids are flowing has a small enough thickness to allow high flow rates through annular passage 60 and up through the screen assembly 28 to the surface. However, if a branch feeding flow to valve 40 is allowed to come in and produce hydrocarbons, the sleeve 68 comes in contact with the hydrocarbons and proceeds to swell to such an extent so as to block annular passage 60 against further flow. The produced stream can no longer short circuit the screen assembly 28 by flowing through passage 58. Rather, the produced flow proceeds outside of coupling 66 until it comes upon a screen section from screen assembly 28. At that time, as desired, the produced fluids are forced through a screen to limit production of sand or other impurities. FIG. 5 shows sleeve 68 before swelling and FIG. 6 shows sleeve 68 after swelling toward the closed position.

While the preferred material for sleeve 68 is an elastomer, rubber, EPDM or Halobutyl which swells dramatically when exposed to hydrocarbons, the valve of the present invention encompasses other designs that will pass mud and completion fluids and can be triggered to close upon commencement of production flow. Thus the sleeve 68 can be made of other materials than rubber, such as elastomers, and does not need to be uniform along its length. It can comprise of combinations of materials that exhibit swelling or expand to close a flow path when exposed to hydrocarbons. Alternatively, the sleeve material can be sensitive to produced or injected water, such as a clay like bentonite. Alternatively, the material that will close the valve 40 can be sensitive to any downhole fluid but isolated from it during the completion process. Later, when it is desired to put the branches below valve 40 into production such that production from those branches will flow through the screen the layer 70 that is placed over the sleeve can be defeated, in a variety of ways to expose the produced fluids to the sleeve 68 so that it can swell and close the annular passage 60. For example the sleeve 68 can be made from clays that expand with water such as bentonite or cements or fly ash or other materials that will swell and stay rigid enough to redirect flow. The protective cover 70 can be removed by being dissolved such as by chemical reaction or other form of attack. Alternatively, high flow rates or applied pressure differentials can erode or physically displace the protective covering 70. Water can be from produced fluids or deliberately introduced from the surface.

Those skilled in the art can readily see that the various designs described above allow for a valve to operate reliably in situations where using coiled tubing or wireline is not practical. The design removes the uncertainties of relying on a downhole battery as the power source to operate the valve. Because of its simplicity and reliability of operation, it provides a useful tool when trying to bring in barefoot branches that require high flow rates for completion making it imperative to bypass a screen assembly while still having the flexibility to later direct produced flow from the barefoot branches through a screen assembly, due to the closure of such a valve. Other, more common applications of sliding sleeve valves downhole can also benefit from the valve of the present invention.

The foregoing disclosure and description of the invention are illustrative and explanatory thereof, and various changes in the size, shape and materials, as well as in the details of the illustrated construction, may be made without departing from the invention.

We claim:

1. A valve assembly for fluid flow control downhole, comprising:

a valve body having a passage therethrough;

a valve member in said body selectively operable between an open and a closed position based on a change in the composition of the fluid contacting said valve member*;*

*a screen having an inner passage such that when said valve member is in said open position flow in the well can pass through said screen inner passage and when said valve member is in said closed position flow in the well must pass through the screen because said inner passage is closed off by said valve member.*

2. The valve assembly of claim 1, wherein:

said valve member obtains said closed position by increasing in volume.

3. The valve assembly of claim 2, wherein:

said valve member hardens when exposed to fluid that urges it to said closed position.

4. The valve assembly of claim 1, wherein:

said valve member is responsive to hydrocarbons to move to said closed position.

5. The valve assembly of claim 1, wherein:

said valve member is not responsive, to move to said closed position, to fluids that don't contain hydrocarbons.

6. The valve assembly of claim 1, wherein:

said valve member is responsive to water to move to said closed position.

7. The valve assembly of claim 1, wherein:

said valve member comprises an elastomer.

8. The valve assembly of claim 1, wherein:

said valve member comprises rubber.

9. [A valve assembly for fluid flow control downhole, comprising:

a valve body having a passage therethrough;

a valve member selectively operable between an open and a closed position based on the composition of the fluid contacting said valve member;] *The valve assembly of claim 1, wherein:* said passage comprises an annular passage around a mandrel in said valve body;

said valve member comprises a sleeve in said passage;

said sleeve selectively changing in volume to obstruct said annular passage.

10. The valve assembly of claim 9, wherein:

said valve body having an inlet to direct flow around said mandrel and through said annular passage for contact with said sleeve and an outlet to direct flow from said annular passage into said mandrel to an end connection thereon.

11. The valve assembly of claim 10, further comprising:

[a] *said* screen [having an] inner passage [and] connected to said end connection [such that when said valve member is in said open position flow in the well can pass through said screen inner passage and when said valve member is in said closed position flow in the well must pass through the screen because said inner passage is closed off by said valve member].

12. [A valve assembly for fluid flow control downhole, comprising:

a valve body having a passage therethrough;

a valve member selectively operable between an open and a closed position based on the composition of the fluid contacting said valve member;] *The valve assembly of claim 1, wherein:* said valve member comprises a clay that swells upon contact with water.

13. [A valve assembly for fluid flow control downhole, comprising:

a valve body having a passage therethrough;

a valve member selectively operable between an open and a closed position based on the composition of the fluid contacting said valve member;] *The valve assembly of claim 1, wherein:* a cover for said valve member that is selectively removable downhole.

14. The valve assembly of claim 13, wherein:

said cover is removed by one of mechanical force, chemical reaction, and fluid force.

[15. A method of well completion and production, comprising:

flowing fluid in the wellbore;

taking flow to the surface through a passage in the interior of a valve assembly;

closing off said passage in said valve assembly by virtue of a change in the composition of said flow;

redirecting said flow due to said closing off.]

16. The method of claim [15] *17*, comprising:

using a valve member in said valve assembly made of one of rubber, elastomer, clay, EPDM and Halobutyl.

17. A method of well completion and production, comprising:

flowing fluid in the wellbore;

taking flow to the surface through a passage in the interior of a valve assembly;

closing off said passage in said valve assembly by virtue of [the] *a change in* composition of said [production] *flow*;

redirecting said flow due to said closing off;

connecting a screen to said valve assembly;

allowing flow that passes through said valve assembly to flow through an interior passage in said screen;

redirecting said flow to go through said screen as a result of closure of access to said interior passage of said screen by virtue of said closing of said passage in said valve assembly.

18. The method of claim 17, comprising:

providing a valve member in said valve assembly that closes it responsive to the presence of hydrocarbons.

19. The method of claim 17, comprising:

providing a valve member in said valve assembly that closes it responsive to the presence of water.

20. The method of claim 18, comprising:

providing a valve member that swells to close a flow passage in said valve assembly.

* * * * *